INVENTOR.
TAKASHI TOMITA
BY Jacobs & Jacobs
ATTORNEYS

3,540,844
METHOD FOR MAKING SILICA FIBERS
Takashi Tomita, Osaka, Japan, assignor to Konoshima Chemical Co., Ltd., Osaka, Japan
Filed July 1, 1968, Ser. No. 741,434
Claims priority, application Japan, July 5, 1967, 42/43,556
Int. Cl. C01b 33/00
U.S. Cl. 23—182     7 Claims

ABSTRACT OF THE DISCLOSURE

Novel silica fibers and novel manufacturing methods are provided based on feeding steam and gaseous silicon halide into a reactor at a temperature of 500 to 800° C. and obtaining pure fluffy silica in fiber form for use as thermal insulating material, high temperature filters, electric insulation, space industry material, etc. The silica $SiO_2$ is deposited when $SiF_4$ and $H_2O$ are reacted in contact with reactor surfaces to form silica particles and fibers which become growth nuclei. The silicon fluoride or chloride and steam flow at a velocity lower than 1 m./sec. and the coagulated lumps of resultant silica fiber are isolated from the gas flow containing the by-product hydrogen halide at a temperature higher than the dew point of the hydrogen halide. There is a special speed-temperature relationship with respect to the reactor surface area. Sodium silicofluoride may replace the silicon fluoride.

---

The present invention relates to new and novel silica fibers and new and novel methods of manufacturing or producing the same, based on the process of feeding steam and gaseous silicon halide into a reactor which is maintained at a temperature range of 500 to 800° C., and the main object of this invention is to produce pure, fluffy silica fibers efficiently.

It is an established fact that silica fibers are indispensable to modern industries, inclusive of the space industry, for use as a fireproof thermal insulator, high-temperature filtering materials, high-temperature electric insulation materials, etc.

The process heretofore used in producing silica fibers is (1) melting and flattening out quartz at high temperature, or (2) treating glass fibers having a special composition prepared for such a particular purpose with acid to remove the sodium and other impurities contained therein, leaving silica as the end product.

In the former case, however, a heat treatment of over 1600° C. is required to melt and flatten out the quartz. This means that a production facility capable of functioning under a tremendous heat is necessary, thus rendering it quite difficult to mass-produce silica fibers as is done with common glass fibers. In the latter case, the impurities cannot be completely removed by the acid treatment although production of such a glass fiber itself is a firmly established technique. Even if they could be removed, the silica fibers thus obtained would be like an empty shell and become deteriorated in quality. Furthermore, the silica fibers produced by the above processes are straight or slightly crimped, measuring from a few microns to scores of microns in thickness, thus rendering it difficult to keep them in an intertwined or a woven condition. It therefore becomes necessary to use some form of a binder or a lath to mold the fibers into desired shapes and forms. The use of a binder or a lath, however, tends to deteriorate the finer qualities of silica and it is troublesome for the users.

There have already been several proposals relating to the production of $SiO_2$ and hydrogen halide by the reaction of silicon halide with $H_2O$. The objectives stipulated therein are, however, mostly restricted to producing powdered silica for use as pigment and rubber fillers. Furthermore, such reactions are carried out in a flame of over 1000° C. Another potential area wherein a particular fiber growth of a similar nature may develop is the electronic industry which is capable of producing membranous silica. This technique, however, is concerned mainly with the method of producing a thin, flat molecular layer of silica. Dr. W. Haller was the first to report the possibility of obtaining silica fibers by the above process [cf. Nature, 191, No. 4789, p. 662-3 (1961)] but he was able to obtain only silica fibers of microscopic sizes at a very high reaction temperature of 1100° C. He also stated that a colloidal silica was the only possible derivative below that temperature level.

The present invention relates to the discovery of a reaction temperature level which is well suited for the growth of fibered silica and is within a temperature range far below that originally reported in the process of reacting silicon halide with steam. The present invention also relates to the discovery of a silica growth into fibrous condensates, readily visible to the naked eye, a few seconds after the rate of the gas flow into the reactor is adjusted.

The present invention further relates to the discovery of an improved efficiency in silica fiber formation by the presence of seed nuclei or a base surface while the reaction is taking place within the aforementioned temperature range. This invention basically relates to the discovery of a particular method for producing silica fibers substantially pure and with excellent shape-maintaining property through intertwining with each other with the characteristic feature of supplying seam and a gaseous silicon halide selected from a group consisting of silicon fluoride and silicon chloride in a mixed gas flow at a flow velocity lower than 1 m./sec. into a reactor kept at 500–800° C. and isolating the coagulated lumps of the resultant silica fibers from the gas flow containing the hydrogen halide formed as a by-product at temperatures sufficiently higher than the dew point of said hydrogen halide. The present invention still further relates to the particular method of producing silica fibers substantially pure and with excellent shape-maintaining property through intertwining with each other with the characteristic feature of feeding a mixed flow of steam and gaseous silicon halide selected from the group consisting of silicon fluoride and silicon chloride at a speed rate of less than one m./sec. into the reacting chamber which is maintained at 500–800° C., in which silica seed nuclei are placed in advance or simultaneously fed with the mixed flow and isolating the coagulated lumps of the resultant silica fiber from the gas flow containing the hydrogen halide formed as a by-product at temperatures sufficiently higher than the dew point of said hydrogen halide. The present invention also relates to the particular method of producing silica fibers by feeding a mixed flow of steam and gaseous silicon halide selected from the group consisting of silicon fluoride and silicon chloride at a speed of less than 1 m./sec. into the reacting chamber maintained at between 500–800° C., in which a base surface of non-corrosive (stainless steel, platinum, ceramic products) plate, screen, etc. is established and isolating the coagulated lumps of the resultant silica fiber from the gas flow containing the hydrogen halide formed as a by-product at temperatures sufficiently higher than the dew point of said hydrogen halide.

The features of the invention are detailed as follows:

Silicon halides used in this invention are silicon fluoride and silicon chloride. Silicon fluoride will be used in the following examples as well as explanations since it is the common silicon halide compound and its by-product presents the most serious disposal problem. To further elaborate on the particular reaction temperature of this invention, it is recalled that colloidal silica was previously reported as the only derivable product at a temperature below 1100° C. After a series of experiments, however, it was discovered that, for an industrial purpose, the optimum temperature for silica fiber growth was somewhere around 650° C. Further researches conducted along this line finally resulted in the ultimate arrival at this present invention.

The invention will be more fully understood from the accompanying drawings wherein.

Figure 3:
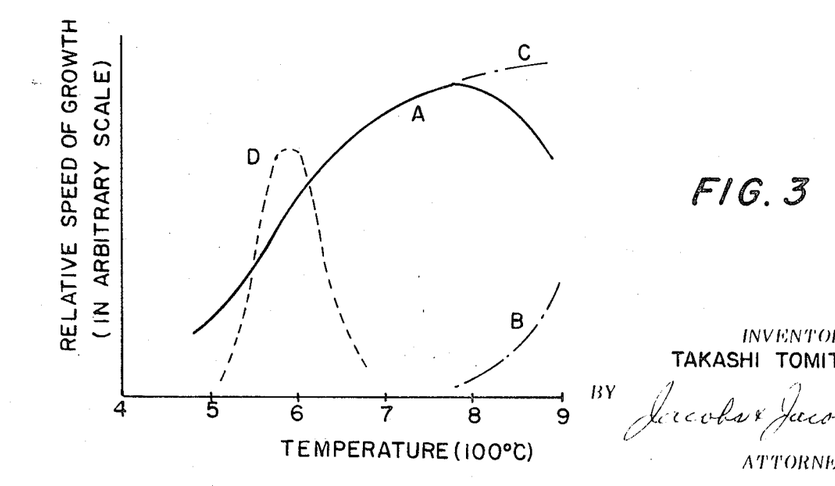
FIG. 3 is a graphic showing of the speed-temperature relationship in the formation of the silica fibers.

Referring first to FIG. 3 which graphically shows the relationship between the silica formation speed and the reaction temperature, Curve (A) shows the silica fiber growth speed in which silica was its own growth nuclei. Curve (B) shows the growth speed of silica other than the fibers in the above case. Curve (C) shows the growth speed of the entire silica, the sum total of (A) and (B). Curve (D) shows the silica fiber growth speed at its early stages, when rust-proof plates or screens were used as the base surface. These are diagrammatic illustrations of the relative tendencies.

Curve (A) shows the general tendency of the silica growth speed observed when masses of silica fibers are formed around the nuclei which developed spontaneously inside the reacting chamber, or when the silica fiber mass already present in the reacting chamber acts as nuclei and develops into a larger mass. The growth speeds become conspicuous from about 500° C., and gradually increase with the rise in temperature. But, when the reaction temperature exceeds 800° C., the silica, as shown in curve (B), tends to take some form other than fiber, such as slabs and fish eggs. Thus, although the silica growth speed, as a whole, may show a gradual increase as illustrated by curve (C), silica fiber itself will commence a gradual decline.

However, the absolute value of the growth speed and the limit within which the silica is evolved in a fibered form are determined not only by the temperature but are influenced by the partial pressure and the rate of the gas feeds and the surface area of the silica nuclei present. A definite conclusion, therefore, is not to be arrived at and FIG. 3 is presented to show the relative tendency.

When rust-proof plates or screens are employed as a base surface, a peculiar movement is generated as shown by curve (D). The optimum temperature range for the silica fibers to become readily attached to the surface is narrower than that in curve (A), and a distinct upper limit is evident.

Because silica fibers which become attached to the seed start growing, and subsequently act as new growth nuclei, the growth temperature after a lapse of time gradually begins to follow curve (A).

As shown in curve (D), powdered silica particles and silica fibers readily turn into growth nuclei when exposed to the 600° C. (plus/minus 50° C.) temperature range, and the corrosion-proof plates and screens, too, are capable of turning into a base surface. $SiO_2$ deposited when $SiF_4$ and $H_2O$ come into contact with these surfaces, reacts in such manner as to increase the length and thickness of the fiber.

The growth speed of a single fiber cannot be measured exactly, but, when the reaction chamber which is maintained at an appropriate temperature is observed through a mica peep-hole, the mixed gas feeds, a few seconds after it is blown into the reactor, evolve into small fluffy masses of about a few mm. in diameter, easily observed with the naked eye, and is carried away by the gas flow. It is assumed from this that the growth speed easily comes up to 1 mm./sec. or better during the early formation period. When the silica fiber mass grows to fill up a cross section of the reacting chamber, the growth in the layer thickness apparently does not reach this speed. Speeds of a few cm. to several tens of cm./hr., however, were actually observed.

When a bulky mass of silica fibers is desired, the silica growth surface must necessarily be within an appropriate growth temperature range. Furthermore, care must be taken to keep the gas feed, which is composed of a mixture of $SiF_4$ and $H_2O$, from being exposed to this optimum temperature until it actually reaches the growth surface. The reason is that a new nucleus is evolved as soon as the gas mixture arrives in this appropriate temperature space, around which a very small but undesirable fluffy mass of silica grows and is carried and blown by the gas stream onto the surface of the growing silica mass. If such condition is left to prevail, the silica mass is not only deteriorated, but an air resistance is built up in the reactor to such an extent as to hinder the operation.

Three things must be considered in growing the fiber into a large mass avoiding the above difficulties. The first concerns the mass surface; that is when a linear fiber growth is desired. In such case the mass and the optimum growth temperature range must make relative movements at a speed required with the growth speed of the mass size.

The second concerns the inner condition of the mass; that is when a growth in the thickness of the fiber is desired. In this case, the mass which has already began taking shape will have stopped growing for this temperature range, or will at least in comparison with the linear growth speed, be progressing at a very slow rate.

As far as the first condition is concerned, a steep incline of the temperature at the front end of the growing surface is desired.

As for the second condition, no change or a gradual decline in the internal temperature of the mass is desirable. However, because the silica fibers inside the mass are continually growing as nuclei, the appropriate growth temperature range becomes, as mentioned previously, somewhat wider, ranging from about 500 to about 800° C. This works favorably for improving the silica recovery rate and increasing the thickness of the silica fibers. The extreme temperature rise, however, should be avoided for practical purposes because it tends to work out unfavorably, such as speeding up the facility corrosions and silica recovery in a form other than fiber, such as fish eggs, slabs, etc.

The third condition concerns the method of mixing the gas as an auxiliary measure when the above two conditions fail to give the desired results. It is preferable not to mix the $SiF_4$ gas with the water vapor at the entrance of the reacting chamber, or even before, but to feed both, or even one of the gases, by diffusing it lengthwise inside the reactor, or to feed them separately, one from each end of the reactor, and to anticipate a diffusion or a back mixing to be generated without the aid of any agitating implement, and to discharge them out from the middle section.

When the growth process is implemented with a careful temperature control, the increase in the draft resistance is almost negligible, and the size of the silica mass is limited only by the capacity of the container and the extracting outlet.

In producing silica fibers by reacting silicon halide with water vapor, it is especially important that the apparent gas feed rate or the agitation, and the material feed rate on the base surface are properly controlled. First, a powdered form of the product is obtained if the gas speed is too fast, because the nuclei are carried out of the reaction area without giving them sufficient growing time; or even if there were a few particles which were in the process of growing, they will, if the transporting is too rough, immediately break down into dusts.

Several solutions are suggested to make powder; such as diluting the gas content, building up the apparent gas speed, or reacting in turbulent flames, or designing special nozzles or slots to build up an extreme agitation. These means are known to build up a gas flow rate inside the reacting chamber, averaging at least over 2 m./sec., and tens of m./sec. at particular points. But, if fibered, or more specifically a membranous form is desired, the gas flow must be milder. The use, therefore, of a special agitating means or an excess dilution is undesirable, and an apparent gas flow of less than 1 m./sec. is recommended. In an extreme case, it is preferred that the flow is as slow as at a standstill. Of course, these are not the only determining factors in fixing the gas flow speed, but it goes without saying that in obtaining a silica fiber of a desired thickness and length, or to produce a bulky mass of silica fibers by planting nuclei, the reacting time must be fixed accordingly in relation to the size of the reactor required to obtain a desired mass size.

The difference in the method for producing silica fiber and silica membrances lies basically in the speed with which the materials are fed to the base surface. This fact, not yet generally known, was proven in my tests and is supported in a few reports made public by other researchers. According to these reports, the higher limit of the growing rate to the thickness of the silica membrane derived from the vapor phase growth process is determined by the temperature. This limiting rate, in the range of approximately 500–800° C. of this invention, is a few microns/hr., and when calculated in terms of weight, comes to about 1 mg.-$SiO_2$/cm.$^2$/hr. If the material is fed continuously to the base surface area unit at a speed below this rate, silica will continue to grow under the minimum surface energy condition, i.e., in membranous form. On the other hand, if the rate exceeds this limit, the tendency will be toward a gradual increase in the surface area, resulting in the formation of an irregular dendritic deformation which, after passing through a fiber stage, will mostly end up as silica powder. According to my observation, the optimum material feed rate for the silica fiber growth under the temperature condition mentioned above, is within an area of approximately 10 to 1000 mg.-$SiO_2$/cm.$^2$/hr per unit area of the fixed base surface. The range of 50 to 500 mg.-$SiO_2$/cm.$^2$/hr. is greatly preferred. However, for the sake of clarity it is desirable to point out that because the individual fiber, as mentioned earlier, develops at the rate of a few mm./sec. at the early growth stage, the speed with which the cross section of the fiber grows, when it is looked upon as a base surface, will have reached kg.-$SiO_2$/cm.$^2$/hr. even if only for a very short time. Thus, accordingly, the upper limit of the material feed rate must be accepted as approaching this value.

This invention includes the novel discovery of the combination of an optimum level in the reaction temperature and the rate of the gas feed.

When silica fibers produced by the basic method of this invention are observed under a microscope, they are found to be transparent and, in most cases, show scores of fiber masses radiating from the nuclei, with each single fiber branching out at the far end. In the contrary to common knowledge for the fibers to develop from the root in one direction only, the branching is quite often observed in a bridgelike formation between two individual fibers, giving cause to wonder whether nuclei of a microscopic network structure are developed at an almost unbelievable speed during the early growth stage. This network structure plays an important role as a sort of a form-preservability for the silica mass. If the thickness of the fiber is of no concern, the gas mixture may be fed through the reaction chamber in a few seconds time, with only 2–3 seconds exposure to the optimum growth temperature. The fiber, within this time, will attain a length of a few hundred microns to a few mm., and a thickness of about $10^{-1}$ microns and occasionally about 1 micron. In other words, the growth rate is over 1 mm./sec. for the length and $10^{-2}$ to $10^{-1}$ micron/sec. for the thickness. The agglomerated fiber thus derived will be elutriated by the gas flow. The growth speed of the silica mass increases with the temperature rise. Besides, the recovery rate increases accordingly with the equilibrium conversion rate derived from a thermodynamical calculation. An increase in both the partial pressure of the gas feed and the reaction temperature increases the recovery rate. The actual recovery rate averages only about 70–80% of the equilibrium conversion rate, and about 20–60 percent of the $SiO_2$ in the feeds are converted to $SiO_2$ under the conditions stipulated in this invention.

The volumetric ratio of the gas and the mass is roughly calculated at 100:0.5 to 1. Planting of seed nuclei is effective in raising the per volumetric and time units growth speed of the reaction chamber.

Powdered silica with a large relative surface area, such as the pulverized silica fibers obtained through this reaction, or powdered silica gel is a very effective seed nuclei. As an example, an introduction of 10 percent of the total growth resulted in an approximate 50 percent rise in the growth rate. The gas, after emerging from the reaction chamber, is cooled, and the hydrofluoric acid and the hydrofluosilicic acid or the mixture thereof are condensed after reaching their respective dew points. Since $SiO_2$ quickly dissolves in hydrofluoric acid at this temperataure, the fiber mass must be separated from the gas current before the gas reaches the dew point. Furthermore, even if a gas source other than silicon fluoride is used, the fiber must be separated at a temperature higher than the dew point of the by-product silicon halide, because even if the $SiO_2$ itself is not attacked, subsequent washing and drying of the product becomes necessary and, the purity of the product is adversely affected.

This separation may be understaken by any known process, but to preserve the property of the product, the settling chamber has been found to be the more appropriate. If the system is capable of withstanding a considerable pressure loss, the gas flow may be separated from the fiber mass by filtration in conjunction with the molding process to be explained later. In such case, it is necessary to estimate the pressure loss at 10 mm. to scores of mm. in water gauge for every mm. of thickness in the filtered mass. This method is the more advantageous if an expeditious suspension and resumption of the gas feed operation, i.e. a switch-over of the system as illustrated later, is available. After extracting the soft, fluffy mass, it is compressed into a desired shape by the wet process or the more preferable dry process. Compressing in this instance refers not only to the method undertaken in pressing the material between two flatboards or molds, but also the pressure generated in the filtering system, utilizing the stream pressure, or the vacuum forming. It is also intended to include, as a specific case, a system similar to the method used in making paper yarns. Silica fiber products produced and processed by these methods take on a feltlike appearance and have an apparent specific gravity of 0.02 to 0.2 g./cm.$^3$. They are capable of withstanding a considerable amount of bending and stretching and are of good plasticity. Of these, the dry vacuum forming system is the most expedient in maintaining the elasticity and the lightness of the fiber mass, and most effectively utilizes the electrostatic cohesion of the individual mass. Fabricated silica products, such as compressed silica boards and silica tissues are obtained by these methods. All these are capable of being cut into required forms for secondary processings, thus making pure silica fabricating materials available.

The nuclei that are exposed for a certain length of time in the appropriate growth temperature range in the reacting chamber, or the silica fibers that were allowed to grow on the base surface, when observed under a microscope are transparent, gracefully curved and maintain an even thickness of considerable length. Under an electron microscope, the silica fibers are cylindrical in shape with a round cross section. Branchings are seen here and there, manifesting a tendency to split into four or more ways rather than three. This fact suggest sthat "knods" which facilitates this branching, is created somewhere during the early or the middle growth stage. This is especially true in the case of an incomplete growth, when silica is then seen to undergo a radial growth around a single nucleus. This branching makes it difficult to establish a single fiber length, but fibers of a single strand a few cm. long are obtained from an identical reaction under laboratory conditions. The length of the single fiber strand is an important factor in determining the shape preserving property of the silica fiber mass. In other words, fiber mass with an average length of a few cm. manifests a rather strong tear resistance and a splendid shape preserving property. On the other hand, silica fibers of less than a mm. in length are, by contrast, almost a mass of dust particles which, under the slightest mechanical shock, continue to crumble down. Therefore, silica fibers averaging more than a few mm. in length are believed necessary for practical applications.

Another factor in determining one other important property of the silica fiber mass, i.e. the hardness, is the thickness of the fiber. When the fiber is too thin to distinguish each strand piece by piece under optical instruments, the mass, to the naked eye, will appear like a colony of mildew with a velvet gloss, and will crumble at the slightest touch of the finger tips. A one micron thick fiber is still somewhat brittle, but presents a cotton-like touch. At one to five microns, the mass, to the naked eye, will appear like a white foamed plastic and will reveal a sponge-like elasticity and resilience, as shown by the dent in the surface which returns to its original level when the finger is removed. This property makes it suitable for use in heat insulations, etc. When the fiber grows to a thickness exceeding 10 microns, the mass hardens, but the apparent specific gravity of the mass in both cases will range between $10^{-3}$ to $10^{-2}$ g./cm.$^3$.

It is indeed very difficult to control the length and thickness of the fibers but several ways of operation conditioning may be considered. The decisive factor in the fiber length, for instance, is to maintain the relative speed between the mass and the growth temperature within the scope of the growth rate of a single fiber, as mentioned in condition No. 1. If the former exceeds the latter, silica will grow like shreds of cumulus cloud at the front end of the silica mass growth, a condition which will not allow the fiber strand to grow any longer. The greatest relative speed experienced in laboratory tests was tens of cm./hr., but, if economically feasible, a slower rate is more desirable.

The thickness of the fiber growth, roughly speaking, is influenced by the basic thickness attained through conditions existing during the early growth stage and, although not proportionately, the length of time the fiber is exposed to the optimum growth temperature. Efforts to establish an individual speed evaluation of the thickness growth were not successful, so the digital presentation alone is provided. But the speed in the growth of the diameter at the early stage has been set at $10^{-2}$ to $10^{-1}$ micron-sec. At the later stage, the diameter growth speed drops 1 to 2 digits to less than about 10 microns/hr.

Figure 1:
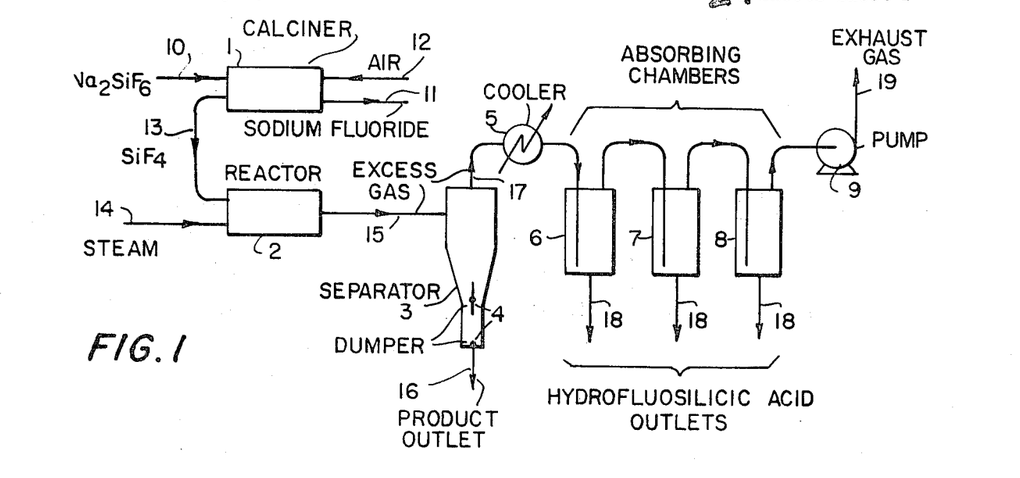
FIGS. 1 and 2 are schematic plans showing the equipment used in producing silica fibers.

Reference is now made to FIG. 1 which shows a schematic plan for the installation of equipment used in producing the present silica fibers and wherein 1 is a calciner, 2 is a reactor, 3 is a separator, 4 is a double dumper, 5 is a cooler, 6, 7 and 8 are absorbing chambers, 9 is a suction pump, 10 is the sodium silicofluoride input, 11 is the sodium fluoride output, 12 is an air inlet, 13 is the silicon tetrafluorde feed line into reactor, 14 is a steam inlet, 15 is the excess gas (product carrier gas) circuit, 16 is the product outlet, 17 is also an excess gas circuit, 18 are the hydrofluorosilicic acid outlets, and 19 is the exhaust gas outlet.

Sodium silicofluoride was used as the $SiF_4$ gas source; it is generally known that the most common and economical way of obtaining sodium silicofluoride is the treatment of the exhaust gas evolved during the phosphate rock acidulating process. This is further decomposed into $SiF_4$ and NaF by means of thermal decomposition. $SiF_4$ is claimed to reach a vapor pressure of 1 atm. at about 1000° C., but if the partial pressure of the $SiF_4$ is lowered by diluting it adequately with air, a complete decomposition will take place at a temperature lower by about 200 to 300° C. The $SiF_4$ concentration at this stage is about 5 to 0.1 percent. In the experiments conducted by this inventor, this dissolution was carried out in calciner 1. A stable $SiF_4$ feed rate is established by maintaining a steady $Na_2SiF_6$ feed supply and a fixed calcining condition. The diluted $SiF_4$ gas thus obtained is fed into the reactor 2 through the inlet 13. By bubbling a measured volume of air in water of a fixed temperature, an evenly concentrated water vapor is fed in a fixed rate through the inlet 14. The excess gas outlet 15 is maintained at the other end of the reactor, and the evolved silica fiber agglomerates, the by-product HF, and the unreacted $SiF_4$ and $H_2O$, together with the carrier gas, are fed into the separator 3 whose wall surface is adequately heated to prevent condensation. The fiber mass settles at the bottom of the forces of gravity, centrifuge, and electrostatic force, and is discharged by way of the double dumper 4 and outlet 16. The gases separated from the fiber mass, on the other hand, are fed into absorbers 6, 7 and 8 by way of cooler 5. In my experiments, an attempt was made to conduct the separation and the shape molding process simultaneously by screening the reactor 2 outlet, but the pressure loss on the cake layer was too great. And, because an alternative reactor 2 was not provided for in this experiment, I could not obtain the sufficiently diluted air to flow into calciner 1 even with the absorber in an excess vacuum condition. This resulted in an insufficient calcining and a product layer of over 10 mm. thickness was not obtainable. Therefore many of our moldings, as mentioned above, were tested after removing them from the system. Of the various test methods employed, the best result giving out a soft product came from the process which involved the method of re-dispersing the mass in an air current and obtaining cake layers on the filter through which the current was filtered. A typical example of the physical property of the product is as follows:

Mass cake pressure—700 mm. Hg
Thickness—20 mm.
Apparent specific gravity—0.035 g./cm.$^3$
Tensile strength—70 g./cm.$^2$
Tear resistance—30 g./cm.$^2$ A small lightweight fabricated insulator of pure silica was produced for the first time with this method. Silica was thus recovered at a rate of 20 to 60 percent under the following conditions:

| | |
|---|---|
| Concentrate | 0.5 to 5% $SiF_4$ gas. |
| Quantity | 0.5 to 10 times the theoretical quantity derived from the $H_2O$—$SiF_4$ reaction. |
| Speed | Standard $SiF_4$ gas volume speed divided by total reactor capacity within the space speed of 2 to 20 Nm.$^3$/hr. m.$^3$ range. |

The product thus recovered is almost totally pure silica with less than 0.1% and 0.2% total F and $H_2O$, respectively. The impurities are further minimized by "washing" the fibers with high temperature dry air.

On the other hand, the gas discharged from separator 3 is recovered in a set of at least two, and preferably three, absorbers 6, 7 and 8 aligned in a series as shown in FIG. 1.

Transparent 45 percent $H_2SiF_6$ is obtained in the first absorber 6 and a 30 percent $H_2SiF_6$, usually with the presence of silica precipitates, are recovered in the second absorber 7. However, when the $SiO_2$ recovery in the reactor exceeds 33% and the slurry in the second absorber is circulated back into the first absorber, it is understandable from the following chemical equation that there will hardly be any silica precipitate left in the entire system.

$$3SiF_4+2H_2O=SiO_2+2H_2SiF_6$$

A 45% $H_2SiF_6$ concentration is regarded as almost beyond the scope of the azeotropic formation at normal pressure, and this concentrate cannot be obtained merely by the simple process of concentrating weak hydrofluosilicic acid. The fact that a likely product can be produced without being bothered by the problem of silica precipitates, which eliminates the necessity of filtration or decantation, is veritable proof that this invention can be advantageously industrialized.

Figure 2:
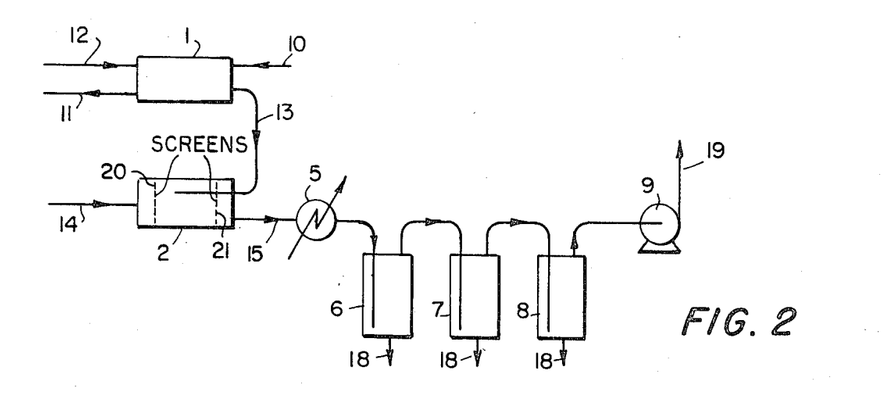

FIG. 2 shows the reaction method with a stainless steel screen previously installed in the reactor and like numerals used in FIG. 2 have the same significance as in FIG. 1. Numerals 20 and 21 designate steel screens in reactor 2 which components 10, 11, 12, 13, 14, 15, 18, and 19 are, as in FIG. 1, the sodium fluosilicate inlet, the sodium fluoride outlet, the air input, the $SiF_4$ reactor inlet, the steam input, the excess gas outlet, the hydrofluosilicic discharge, and the exhaust gas outlet, respectively.

The diluted $SiF_4$ gas, which is obtained from sodium fluosilicate in a manner similar to the basic invention, is fed in the middle sector 13 from one end of reactor 2. The other material, $H_2O$, is fed through the other reactor end 14 with its concentration and quantity adjusted by bubbling a steady supply of temperature controlled air in a manner similar to the basic invention. In the vicinity of the two ends of the reactor, screens 20 and 21 are installed to serve as the initial surface and to obstruct the mass from growing outward. These pieces of equipment are all of stainless steel. Exhaust gas outlet 15 is established rather close to the $SiF_4$ inlet, and the by-product, HF, the unreacted $SiF_4$ and $H_2O$ are circulated to absorbers 6, 7, 8 through cooler 5 together with the carrier gas. The locations of gas outlet 13 and 15 and steel screens 20 and 21 are not necessarily restricted to any given points, and the drawing represents only one phase of the various arrangements experimented with and which gave best results.

Reactor 2 is provided internally with coiled electrothermic wires, and is so designed that the temperature near the wall is easily recorded. The heat gradient of the cylindrical furnace, coiled evenly with a measured length of electrothermic wires, is by nature, lengthwise. That is, the highest point is located in the middle and the lowest at both ends with the crest of the curve line outlining a rounded hill top. An attempt was made to utilize this unavoidable heat gradient to our advantage in the following manner.

Before feeding the gas at the start, reactor 2 was preheated until screens 20 and 21 at both ends of the reactor are heated to the optimum growth temperature of approximately 600° C. The gas flow is then initiated, and the screens, functioning as growth surfaces are immediately covered with silica. More particularly, screen 20 on the upper end of the steam current begins functioning as a "true" reacting surface for the $H_2O$ and the $SiF_4$ which come by diffusion. But screen 21 on the lower end of the steam current functions mainly as a filter in the beginning, separating the fluffy mass from the gas coming in from the upper end. The fibers clinging onto screen 21 grow into a nuclei and begin growing. Small particles of quartz glass, far bigger than silica fibers when observed under a microscope, are often noticed on screen 20. This is suggestive of a change in the structure of the product which is due to a change in the $SiF_4:H_2O$ ratio. But, although it is believed that the $H_2O:SiF_4$ mol ratio in the gas mixing process described in the test operations, ranges from almost zero up to almost infinity, depending on the location, there is no mistaking the fact that the product in the reactor is almost homogeneous and that the greater portion definitely is silica fibers. When the fibers are observed covering both screens and starting to grow, the temperature of the entire reactor is gradually lowered; that is, the locality of the optimum growth temperature range in the reactor is gradually moved toward the center. The speed of this movement, as mentioned earlier, is usually a few cm./hr., but tests were conducted at times with this speed raised up to some tens of cm./hr. When the central section of the reactor reaches optimum growth temperature, the reaction is halted, the mass is "washed" with slightly heated air, the fluoride gas is discharged, and the mass, now filling the space between the two screens, is removed or it may be taken out from the reaction chamber without washing and may be "washed" with hot air, etc. in another washing apparatus.

On the other hand, before the products are removed, the fixed mass may be exposed to a sweepage with an optimum growth temperature by fluctuating the reactor temperature a few more times, a process by which the mass is further hardened. Products of desired shapes and forms are acquired by rearranging the space between screens 20 and 21, and by inserting a mold. A formless mass of appropriate hardness and elasticity can be cut with a sharp implement to a desired shape and form.

The apparatus to be employed in the process of the present invention is not limited to those shown in FIG. 1 and FIG. 2, and it is contemplated for example, to make one in which more than two reactor furnaces 2 are provided so as to supply the material gas from the calciner 1 alternatively into each of them at intervals. In this case, the process of silica fiber formation and the process of washing or separation may be carried out in each reactor furnace successively in repetition so that the material gas can be utilized efficiently and the whole manufacturing apparatus can be made to work more smoothly.

The gas feed process, the recovery rate and quality of the fibers, and the method for disposing of the excess gas are identical with the basic embodiment of this invention.

In the preceding explanations, the use of sodium silicofluoride as the source of silicon fluoride has been given. It is to be understood, however, that siilcon fluoride produced by other methods may also be applicable in the present invention.

The present invention will be further understood from the following nonlimitative examples.

EXAMPLE 1

In the schematic plan outlined in FIG. 2 the stainless steel cylindrical calciner 1, with an inner diameter and length of 150 mm. and 500 mm., respectively, was electrically heated and the walls of the central section were maintained at a temperature of 790° C. (plus/minus 10° C.). Powdered sodium fluosilicate was continuously fed into the reactor from inlet 10 at a speed of 150 g./hr. with a screw feeder. Sodium fluosilicate was calcined as it was evenly advanced forwardly by an agitator blade, and a theoretical amount of 99.3 percent $SiF_4$ was vaporized by the time of discharge from the other end 11 after about two hours. About 300 liter/hr. of air were introduced via 12 for dilution purposes. The $SiF_4$ gas was next introduced into reactor 2 through feed gate 13 located in the middle area. Reactor 2 is also of stainless steel with an inner diameter and length of 150 mm. and 500 mm., respectively. Its central wall surface and both ends were maintained at a temperature of about 700° C. and 450° C., respectively. Reactor 2 was equipped with electrothermic and thermometric apparatus, peep hole, and stainless steel rods and plates to be used as base surface. (Screens 20 and 21, in this case, were removable.)

Because about 50 g./hr. of steam is fed into the reactor through inlet 14, three liter/min. of measured air was bubbled through 60° C. water. The flow rate as mixed gas flow is about 0.03 m./sec. at about 700° C. and the supplying rate of material to the apparent surface area is about 840 mg.-SiO$_2$/cm.$^2$/hr. When the base surface was removed, after an operation time of three hours, silica fibers were observed growing on a limited scale in that portion of the rod and plate where the temperature was about 600° C. Probably due to the heat distribution property encountered, the growth on the base surface was almost negligible outside the boundary of the 600° C. (plus/minus 50° C.) range. Fiber recovery was very limited, only about 8 g. being harvested. This is attributable to the narrow optimum growth temperature range and that the base surface was fixed. For this reason, most of the gas at the outset merely passed by after the initial reaction had started, and even if a minor portion of the gas did react, its product is believed to have blown out of the reactor 2 with the current and to have again dissolved into condensed hydrofluoric acid in subsequent cooler 5. The recovered fibers, to the naked eye, appeared feathery and showed a bulk density of 0.008 g./cm.$^3$. The fibers showed a typical thickness of about 0.5 micron and a length of 5 mm., conspicuously branched and weak.

EXAMPLE 2

Test 2 was conducted in a manner similar to Example 1, except that a stainless steel screen wide enough to fill the cross section of the reactor was installed at the outlet of reactor 2. The purpose of this screen is to collect the minute silica fiber mass which is believed to evolve in a floating mass inside reactor 2 and carried away with the current. The screen became clogged in three hours, and operation was halted when the pressure loss reached 600 mm. W.G. The screen, when removed, manifested an even thickness of about 10 mm., with a silica fiber layer resembling a filter cake. Recovery from this area amounted to about 7.6 g. Its bulk density measured 0.043 g./cm.$^3$ and the thickness of the fiber, under an electron microscope, was 0.1–0.25 micron. This minute fiber mass, in a broad sense, was adjudged to have a property suitable for compressed fabrication, so the following test was conducted.

EXAMPLE 3

To remove the silica fibers evolved in Example 2 from the system in original form, the above mentioned screen on the outlet end of reactor 2 was replaced by a reversed conical settling separator 3 with a double dumper 4 and a portion of the piping was altered from that shown in FIG. 1. Test was conducted with the material feed speed and the temperature condition identical to Example 1. The wall of the separator was maintained at about 350° C. with a flexible electric heater, to prevent the acid from condensing. A very fluffy silica fiber mass was removed from the separator at the rate of about 12 g./hr. (recovery rate about 25 percent). These fiber masses were divided into several parts to be fabricated in different methods. Examples of the products obtained in different fabricating methods are outlined below.

A 20 x 20 x 80 mm. test piece was prepared for the bending tests and placed on two props installed 50 mm. apart. The test piece was gradually weighted down in the middle at about 10 g./sec. until the final breakdown, and the load weight at the cracking point was used to solve the following equation:

$$\sigma B = \frac{15}{16} W$$

A similar test piece of 20 x 20 x 50 mm. was prepared for testing the tension strength. A 20 mm. portion at both ends was firmly attached to a supporting gear with an adhesive agent. One of the gears was hung on a fixed hook. The other end was gradually weighted down at the rate of 5 g./sec. until the test piece was torn apart. The load weight at the tearing point was then used to solve the following equation:

$$\sigma t = \frac{W}{4}$$

EXAMPLE 4

A small injector type feeder was installed on pipe 13 through SiF$_4$ gas was fed into the reactor for the purpose of determining the improvement made in the recovery of silica fiber mass in Test 3. Pulverized silica gel was added at an average rate of 2 g./hr. to serve as nuclei. Conditions other than these were identical to Test 3. Silica fibers were then obtained from separator 3 at the rate of 20 g./hr.

EXAMPLE 5

The facilities and gas conditions were identical to Test 1, except that stainless steel screens 20 and 21, measuring in size equal to the cross section, were installed in the area around both ends of reactor 2 (the area which produced the most silica under the conditions stipulated in Test 1). The feeding rate of the material to the apparent surface area of the base is about 270 mg.-SiO$_2$/cm.$^2$/hr. The central portion was maintained for two hours at the initial temperature of 700° C., after which it was gradually reduced at the rate of 30° C./hr., until after seven hours it was down to 550° C. Feeding of the sodium fluosilicate material into calciner 1 was halted after five hours. A loadless operation was thereafter continued until the gas feed was cut off after having operated for seven hours since the start of the operation. The space between screens 20 and 21 was almost completely filled with a silica fiber mass, weighing 79 g., for a recovery of about 33 percent of the vaporized SiF$_4$. The fiber was divided into several featherlike masses, and the bulk density averaged about 0.014 g./cm.$^3$. Typical thickness and length measured a little less than one micron and 5 mm. respectively. The product analyzed 98.9% of SiO$_2$, 0.1% H$_2$O, and 0.02% F.

EXAMPLE 6

With the Test 5 facility conditions still prevailing, the sodium fluosilicate feed rate was maintained at 300 g./hr., the diluting air feed at about 1200 liter/hr., the water distributing air at 300 liter/hr., the bubbling water temperature at 55° C., and the steam feed rate at 55 g./hr. The mean flow rate as a mixed gas flow was about 0.075 m./sec. at about 600° C. and the feeding rate of material to the apparent surface area of the base was about 270 mg.-SiO$_2$/cm.$^2$/hr. The middle wall surface of reactor 2

| Molding method | Bulk specific gravity, g./cm.$^2$ | Bending strength, g./cm.$^3$ | Tensile strength, g./cm.$^2$ | Remarks |
| --- | --- | --- | --- | --- |
| Dry compression, 20 kg./cm.$^2$ | 0.145 | 750 | 110 | (1) |
| Wet compression, 20 kg./cm.$^2$ | 0.118 | 420 | 120 | (2) |
| Dry vacuum, −700 mm. W G | 0.035 | 70 | 30 | (3) |
| Wet vacuum, −460 mm. HG | 0.061 | 75 | 40 | (4) |

[1] If the material is fed irregularly, the product tends to form layers and becomes breakable.
[2] Comparatively few problems encountered in the molding process.
[3] Least problems encountered in the molding process.
[4] Difficulty encountered in removing fiber from filter.

was maintained for one hour at the initial temperature of 700° C., after which it was gradually reduced at the rate of 30° C./hr. and after four hours from the inception of the operation, it was down to 600° C. The temperature was then increased at the same rate until it reached 650° C., and again reduced to 600° C. On the other hand introduction of sodium fluosilicate was carried on for six hours, after which a loadless operation was thereafter continued until halted after eight hours had elapsed since the start of the operation. A thermal sweeping was experimented with in an attempt to further the growth of the fibers already grown. As the result, 104 g. of silica fibers were recovered in the space between the two screens, for a recovery rate of 18 percent of the SiF₄ evolved. Typical fiber thickness was 1-2 microns, and the typical length increased to over 5 mm. The elasticity and shape preserving quality of the fiber mass were also improved. Although gas materials had been introduced individually through two different inlets, the fiber mass between the two screens showed an almost homogeneous array under a microscope, except for a very minor portion (for instance, the filter cake portion on the surface of screen 21 at the lower end of the current). This proves that the H₂O/SiF₄ mol ratio and the concentration of each material have hardly any influence on the growth of this fiber mass, and that it is mostly influenced by the temperature and the current speed of the gas. The following test was conducted to further confirm this.

EXAMPLE 7

With the Test 5 facility conditions still prevailing, the internal fixture (base surface), sodium fluosilicate feed rate and speed, diluting air volume, water feed volume, and the thermal sweeping method were altered in different combinations. The test with the most outstanding result is being described as a typical case.

| Run | Base surface type | Sodium fluosilicate input speed, g./hr. | Feeding rate of material to the apparent surface area of the base surface, mg.-SiO₂/cm.² hr. | Diluting air input speed, l./hr. | Gas concentration (SiF₄), percent | Water vapor input speed, g./hr. | Factor against equivalence 1 | Space velocity (corrected) Nm.³/m.³ hr.² | Mean flow rate of mixed gas flow, m./sec. | Heat sweeping method used | Material input hours, hr. | Operating time, hr. | Yield in grams ³ | Yield in percent ³ | Bulk specific gravity, (g./cm.³)³ | Average thickness, micron ³ | Average length, mm.³ | Touch |
|---|---|---|---|---|---|---|---|---|---|---|---|---|---|---|---|---|---|---|
| 1 | Stainless steel screen (320 mm. apart). | 150 | 135 | 1,200 | 1.5 | 30 | 1.0 | 2 | 0.075 | A | 6 | 8 | 89 | 31 | 0.016 | 1-2 | Over 5 | Spongy. |
| 2 | ....do.... | 150 | 135 | 3,600 | 0.5 | 45 | 1.5 | 2 | 0.15 | A | 6 | 8 | 113 | 39 | 0.020 | 1-2 | ....do.... | Do. |
| 3 | ....do.... | 300 | 270 | 1,200 | 2.9 | 30 | 0.5 | 4 | 0.075 | A | 6 | 8 | 115 | 20 | 0.020 | 1-2 | ....do.... | Do. |
| 4 | ....do.... | 300 | 270 | 1,200 | 2.9 | 30 | 0.5 | 4 | 0.075 | B | 2 | 4 | 53 | 28 | 0.010 | 0.2 | Below 5 | Feathery. |
| 5 | ....do.... | 300 | 270 | 1,200 | 2.9 | 350 | 6.0 | 4 | 0.18 | A | 6 | 8 | 190 | 33 | 0.034 | 1-2 | Over 5 | Spongy. |
| 6 | Stainless steel rods (400 mm. apart). | 300 | 500 | 1,200 | 2.9 | 150 | 2.5 | 4 | 0.12 | C | 6 | 8 | 284 | 51 | 0.040 | 3-5 | ....do.... | Hard foamed plastic-like. |
| 7 | ....do.... | 300 | 500 | 1,200 | 2.9 | 150 | 2.5 | 4 | 0.12 | D | 6 | 8 | 251 | 45 | 0.036 | 2-3 | Below 5 | Do. |
| 8 | Baffle boards (200 mm. apart)⁴. | 300 | 270 | 600 | 5.6 | 30 | 0.5 | 10 | 0.05 | E | 2 | 4 | 49 | 26 | 0.014 | 1 | ....do.... | Cotton-like. |
| 9 | Baffle boards (100 mm. apart)⁴. | 300 | 270 | 600 | 5.6 | 30 | 0.5 | 20 | 0.05 | F | 1 | 3 | 20 | 21 | 0.011 | 0.5 | ....do.... | Feathery. |

¹ In the column of "Factor against Equivalence," the relation of 1 mole of SiF₄ with 2 moles of water vapor is defined as 1.0 equivalence.
² The "Space Velocity (corrected)" is a quotient of volume velocity of SiF₄ gas under standard conditions divided by effective reaction volume (total volume when the input material is a stainless steel screen; when the input material is baffle boards, it is a volume between the baffle boards).
³ Resulting silica fiber.
⁴ The baffle board is used in order not to increase the gas space velocity only but also to test the possibility to manufacture silica fiber mass with a definite size and shape by the use of a specific template.

NOTE.—Identification of the heat sweeping method is as follows:
A=One hour at 700° C., lowered to 600° C. within succeeding 3 hours, raised to 650° C. within next 2 hours, and lowered to 600° C. within the final 2 hours.
B=One hour at 700° C. and lowered to 600° C. within the following 3 hours.
C=One hour at 700° C., raised to 750° C. within next 2 hours, and maintained at 750° C. for 5 hours.
D=One hour at 650° C., raised to 800° C. within next 5 hours, and lowered to 740° C. within the final 2 hours.
E=One hour at 650° C. and lowered to 600° C. within the next 3 hours.
F=One hour at 650° C. and lowered to 600° C. within the next 2 hours.

EXAMPLE 8

Into an apparatus that replaces the roaster furnace 1 as the apparatus of generating material gas, identical with the one explained in Example 5 except an additional evaporator of silicon tetrachloride (designated hereafter as $SiCl_4$) which is provided with an inlet tube for weighed $SiCl_4$ an inlet tube for weighed air as diluent, and an exhaust tube for the $SiCl_4$ gas that has been diluted by this air, and linking the gas exhaust tube with the reactor furnace 2, are supplied continuously 80 g./hr. of $SiCl_4$ (liquid) and 60 l./hr. of dry air at 25° C. to dilute at evaporation to supply into the reactor furnace 2 about 71.5 l./hr. of a $SiCl_4$ gas with about 16 vol percent concentration which has been generated there. On the other hand, as the materials steam, about 2160 l./hr. of moisture-saturated air at 25° C. is supplied.

The flow velocity of the mixed gases is about 0.1 m./sec. at 650° C. and the velocity of material supply against the apparent surface area of the base is about 90 mg.-$SiO_2$/cm.$^2$/hr.

After the temperature at the central part of the reactor furnace is maintained at 700° C. for 2 hours initially, it is allowed to lower at the rate of 30° C./hr. to reach 550° C. over 7 hours from the start. The supply of the materials is continued for 7 hours, and after the completion of the supply, only air is supplied for 30 minutes for "washing," and the system is cooled and the product harvested to obtain a yield of about 41 g., about 21% against $SiCl_4$. The fibrous silica is formed in markedly clustered state in comparison to the state obtained from fluoride as the material, and the average bulk specific gravity is 0.083 g./cm.$^2$, representative diameter about $2\mu$, representative length less than about 5 mm., and analytical value 99.26% $SiO_2$, 0.16% $H_2O$ and 30.02% F.

Figure 4:
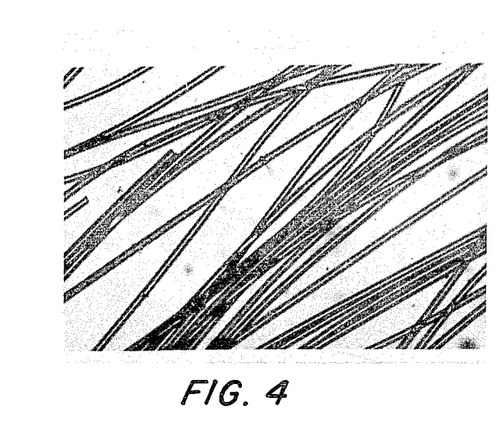
FIG. 4 shows fragments of commercial silica fibers.

FIG. 4 is a representation of a portion of a silica fiber marketed under the trade name of "Siliglass." The view has been enlarged 150 times under a microscope and shows a straight fiber of an almost uniform thickness. These fibers are considered to be either quartz fused and stretched by some method, or glass fiber treated with acid and turned into silica fiber.

Figure 5:
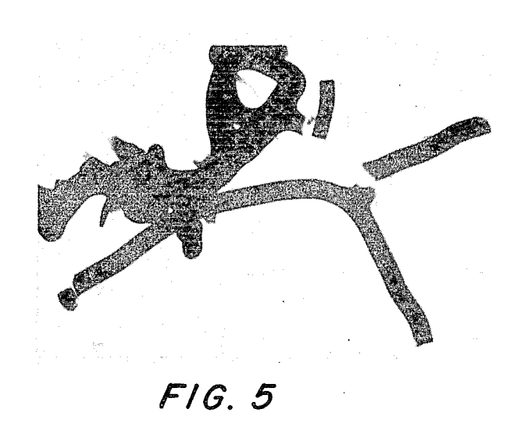
FIGS. 5–7 show silica products and fibers produced by means of the invention.

FIG. 5 is a view of a portion of silica fiber which was obtained by the method illustrated in Example 2, and enlarged 25,000 times under an electron microscope. It shows a fully grown silica fiber branching out and forming a bridge.

Figure 6:
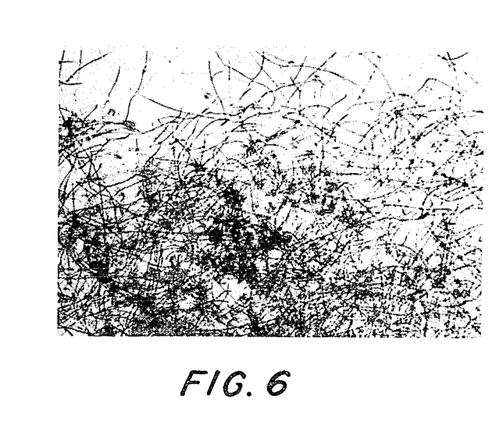

FIG. 6 is a view of a portion of a silica fiber obtained by the method given in Example 6, enlarged 150 times under a microscope. It shows the silica fully developed into a fiber, crimped, branched, and entwined in a tangled mass.

Figure 7:
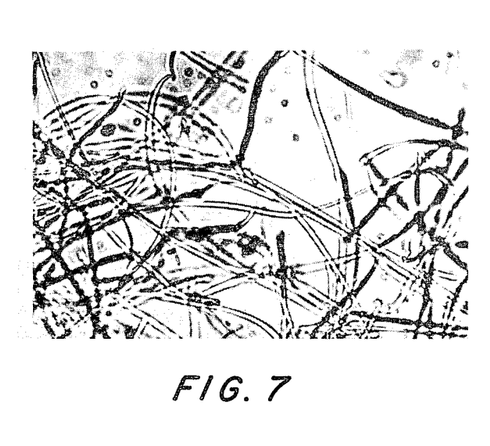

FIG. 7 is a view showing a still greater enlarged portion of the fiber in FIG. 6, enlarged 600 times, definitely showing the silica fibers crimped and branched.

What is claimed is:

1. A process of manufacturing silica fiber in substantially pure condition and with excellent shape-maintaining property through intertwining with each other which comprises supplying steam and a gaseous silicon halide selected from a group consisting of silicon fluoride and silicon chloride in a mixed gas flow at a flow velocity lower than 1 m./sec. into a reactor maintained at 500–800° C. said steam and gaseous silicon halide mixed in an amount sufficient to form coagulated lumps of silica fibers and isolating the coagulated lumps of the resultant silica fiber from the gas flow containing hydrogen halide formed as a by-product at temperatures higher than the dew point of said hydrogen halide.

2. A process of manufacturing silica fiber according to claim 1, wherein to the reactor maintained at 500–800° C. there is supplied to one end of such reactor when empty under supply of silica seed nuclei, steam and a gaseous silicon halide selected from a group consisting of silicon fluoride and silicon chloride, each being diluted by an inert carrier gas, continuously at such a rate that the average velocity of the mixed gas flow in the reactor is below 1 m./sec. and the average staying time of the gas at the zone with adequate temperature for the reaction in the reactor is 2–10 seconds, the coagulated lumps of the formed silica fiber together with the gas flow are withdrawn from the other end of the reactor, and the former separated from the gas flow containing the by-product hydrogen halide by means of a separating apparatus selected from the group consisting of a precipitation apparatus and a filtration apparatus, maintained at a temperature higher than the dew point of the said hydrogen halide.

3. A process of manufacturing silica fiber according to claim 2, carried out in a mixed gas flow, at a flow velocity below 1 m./sec. and at a velocity of supplying the materials of 10–1000 mg. $SiO_2$/cm.$^2$/hr. per apparent surface area of the said seed nuclei and separating the coagulated lumps of the resultant silica fiber from the gas flow containing the by-product hydrogen halide at a temperature sufficiently higher than the dew point of the said hydrogen halide.

4. A process of manufacturing silica fiber which is substantially pure and has excellent shape-maintaining property through intertwining with each other which comprises supplying to one end of a reactor, whose inner temperature is variable by changing the amount of heat to be applied externally thereto and in which has been placed silica seed nuclei around which is previously heated to 600–650° C., a mixed gas flow of steam and silicon fluoride, both diluted by a carrier gas, at an average flow velocity of 0.05 to 0.5 m./sec. and at the velocity of supplying the materials against the apparent surface area of said silica seed nuclei of 50–500 mf. $SiO_2$/cm.$^2$/hr., said steam and silicon fluoride mixed in an amount sufficient to form coagulated lumps of silica fibers making the coagulated lumps of silica fiber and the zone with adequate temperature for the reaction move relatively after silica fiber has attached and started to grow on said silica seed nuclei, by changing the temperature of the reactor to keep the temperature of the surface of the growing lumps constantly at 600–650° C., depending on the direction and velocity of the growth, stopping the supply of the material gas into said reactor after the lumps of the resultant silica fiber have grown to a definite largeness, washing the lumps of silica fiber by introducing some amount of air for purging in turn, and taking out the washed lumps of silica fiber from the reactor.

5. A process of manufacturing silica fiber which is substantially pure and has excellent shape-maintaining property through intertwining with each other which comprises supplying into a reactor, which has been kept at 500–800° C. and provided with a base surface comprising an anti-corrosive substance, steam and a gaseous silicon halide selected from a group consisting of silicon fluoride and silicon chloride, in a mixed gas flow, at the flow velocity below 1 m./sec. and at a velocity of supplying materials against the apparent area of the base surface of 10–1000 mg. $SiO_2$/cm.$^2$/hr., said steam and gaseous silicon halide mixed in an amount sufficient to form coagulated lumps of silica fibers and separating coagulated lumps of the resultant silica fiber from the gas flow containing the by-product hydrogen halide at a temperature sufficiently higher than the dew point of said hydrogen halide.

6. A process of manufacturing silica fiber which is substantially pure and has excellent shape-maintaining property through intertwining with each other which comprises supplying to one end of a reactor, which is kept at an approximately constant temperature and provided with stainless steel-made transfer means, a part of which makes the base surface of the reactor and is placed in the zone with the adequate temperature for the reaction in the reactor kept initially at 600–650° C., steam and silicon fluoride, both diluted by a carrier gas, in a mixed gas flow, at an average flow velocity of 0.05–0.5 m./sec. and at the velocity of supplying materials against the apparent area of the base surface of 50–500 mg.-SiO₂/cm.²/hr., said steam and silicon fluoride mixed in an amount sufficient to form coagulated lumps of silica fibers making the coagulated lumps of silica fiber and the zone with the adequate temperature for the reaction move relatively, after the silica fiber has attached and started to grow on the base surface, to keep the temperature of the surface of growing lumps at 600–650° C., depending on the direction and velocity of the growth, through transfering the lumps by means of said transfer means, stopping the supply of the material gas into the reactor after the coagulated lumps of the resultant silica fiber have grown to a definite dimension, washing the coagulated lumps of silica fiber by introducing some amount of air for purging in turn, and withdrawing the washed coagulated lumps of silica fiber from the reactor.

7. A process of manufacturing silica fiber which is substantially pure and has excellent shape-maintaining ability through intertwining with each other which comprises supplying into a reactor that has been kept at 500–800° C. and provided with an anti-corrosive base surface and silica seed nuclei, steam and a gaseous silicon halide selected from the group consisting of silicon fluoride and silicon chloride, in a mixed gas flow, at a flow velocity below 1 m./sec. and at the velocity of supplying materials against some of the area of the base surface and seed nuclei of 10 to 1000 mg.-SiO₂/cm²./hr., said steam and gaseous silicon halide mixed in an amount sufficient to form coagulated lumps of silica fibers and separating the coagulated lumps of the resultant silica fiber from the gas flow containing the by-product hydrogen halide at a temperature sufficiently higher than the dew point of said hydrogen halide.

References Cited

UNITED STATES PATENTS

| | | | |
|---|---|---|---|
| 3,110,562 | 11/1963 | Hinkle | 23—182 X |
| 3,199,954 | 8/1965 | Pultz | 23—182 |
| 3,236,594 | 2/1966 | Ray | 23—182 |

S. LEON BASHORE, Primary Examiner

R. L. LINDSAY, JR., Assistant Examiner

U.S. Cl. X.R.

65—33